(12) United States Patent
Jordan et al.

(10) Patent No.: US 7,144,182 B1
(45) Date of Patent: Dec. 5, 2006

(54) BALL JOINT CONSTRUCTION

(75) Inventors: James H. Jordan, Apple Valley, MN (US); James H. Sandlin, Shakopee, MN (US)

(73) Assignee: QA1 Precision Products, Inc., Lakeville, MN (US)

( * ) Notice: Subject to any disclaimer, the term of this patent is extended or adjusted under 35 U.S.C. 154(b) by 0 days.

(21) Appl. No.: 11/141,598

(22) Filed: May 31, 2005

(51) Int. Cl.
*F16C 11/00* (2006.01)

(52) U.S. Cl. ............... 403/143; 403/124; 403/125; 403/126; 403/141; 403/142

(58) Field of Classification Search ........ 403/124–126, 403/141–143
See application file for complete search history.

(56) References Cited

U.S. PATENT DOCUMENTS

| | | | | |
|---|---|---|---|---|
| 2,900,196 | A | * | 8/1959 | Nienke .................. 403/134 |
| 3,934,688 | A | * | 1/1976 | Sides et al. |
| 4,372,621 | A | * | 2/1983 | Farrant |
| 4,427,310 | A | * | 1/1984 | Middleton ............. 403/143 |
| 4,662,772 | A | * | 5/1987 | Schultz ................. 403/125 |
| 5,267,805 | A | | 12/1993 | Ueno et al. |
| 5,326,322 | A | * | 7/1994 | Fechter ................. 464/136 |
| 5,509,749 | A | | 4/1996 | Eifert et al. |
| 6,010,272 | A | | 1/2000 | Littman |
| 6,505,990 | B1 | | 1/2003 | Maughan |
| 6,530,711 | B1 | | 3/2003 | Menotti |
| 6,783,136 | B1 | | 8/2004 | Timoney et al. |
| 6,814,521 | B1 | | 11/2004 | Suzuki et al. |
| 6,866,441 | B1 | | 3/2005 | Yokoyama |

* cited by examiner

*Primary Examiner*—Daniel P. Stodola
*Assistant Examiner*—Victor MacArthur
(74) *Attorney, Agent, or Firm*—Nikolai & Mersereau, P.A.; Thomas J. Nikolai

(57) ABSTRACT

A ball joint having a housing with a cylindrical cavity that has an open receiving end and a closed retaining end receives a polymeric insert and a non-deformable insert therein. The polymeric insert has a cylindrical outer wall that extends upwardly from a base and the interior of the insert defines a concave spherical contour. The non-deformable insert fits into a slot formed in the base of the polymeric insert and rests against the housing's bottom. A ball stud comprising a shank with a spherical ball at one end thereof snaps into the polymeric insert and the non-deformable insert. A retaining ring slips over the shank of the ball stud into the receiving end of the housing and its inner surface also has a spherical contour conforming to the spherical ball. The inserts, the ball of the ball stud and the retainer ring are held in the housing by forming the periphery of the housing at the receiving end to overlay the retaining ring.

7 Claims, 3 Drawing Sheets

BALL JOINT CONSTRUCTION

BACKGROUND OF THE INVENTION

I. Field of the Invention

This invention relates generally to ball joint components intended for different applications involving a connection between two parts that require relative motion between them and that involve tensile and compressive loads, such as, for example, in suspension systems and steering systems of motor vehicles, and more particularly to a relatively low cost, long-lasting, ball joint capable of withstanding relatively high compressive and tensile loads.

II. Description of the Prior Art

Many different types of ball joints have been devised over the past 100 years for use on motor vehicles. The earlier designs comprised a metal housing having a spherical, concave socket for receiving a spherical metal ball of a ball stud therein. Because of the metal-on-metal construction, the mating parts experience rapid wear, even when the joint is regularly lubricated. Still other prior art designs have incorporated a compression spring for urging the socket with its spherical concave recess into intimate contact with the ball on the ball stud. See, for example, U.S. Pat. No. 6,020,212 to Littman. The presence of a spring in these designs necessarily results in internal play or clearance created during inward or compressive loading. Inherent with all springs, any load applied inward will deflect the spring and create a clearance condition and unwanted play.

Still other prior art ball joint constructions have incorporated a self-lubricating plastic insert for encasing the ball on the ball stud, but such arrangements have not been able to withstand high compressive loads such as those encountered in instances where the vehicle is made to jump and leave the ground. For example, persons driving all-terrain vehicles (ATVs) frequently traverse uneven ground at speeds that cause the vehicle to leave the ground and fly through the air for several feet before again slamming down onto solid ground. The heavy compressive forces encountered in such instances tend to extrude the plastic socket, thus resulting in premature failure. Further, when leaving the ground, a tensile force corresponding to the weight of the wheels and suspension components can cause many prior art ball joint components to fail. Other prior art ball joint designs, such as exemplified by the Yokoyama Patent 6,866,441 use components loaded from the bottom of the housing and are retained by the formation of a lip on the bottom surface of an end cap. When encountering high compressive forces such as can be developed when operating an ATV, the downward force of the ball against the end cap can spread the lip causing the ball joint to fail.

It is accordingly a principle object of the present invention to provide an improved ball joint construction for use in motion transfer applications including, but not limited to suspension and steering systems on automobiles, trucks, ATVs, snowmobiles and other on and off road vehicles.

Another object of the invention is to provide a ball joint construction that eliminates the need for the traditional spring component commonly used with the prior art.

Still another object of the invention is to provide a ball joint construction in which the components thereof are loaded through the top of the ball joint housing and then retained by forming a lip on the top of the housing making it capable of accommodating high compressive forces.

Yet another object of the invention is to provide a ball joint construction where the ball on the ball stud constitutes substantially one continuous spherical surface so that full surface contact and maximum support of the ball stud from the internal components is achieved.

Yet another object of the invention is to provide a ball joint construction incorporating a molded plastic cup incorporating a metal spider, each having a concave spherical recess for receiving the spherical ball on the ball stud, but which is not subject to extrusion deformation under relatively high compressive loads.

SUMMARY OF THE INVENTION

The foregoing objects and advantages are achieved by providing a ball joint that comprises a housing defining a cylindrical cavity, open at one end and closed at the other. Insertable into the cylindrical cavity through the open end is a polymeric insert having a base with a cylindrical outer wall extending upwardly from the base, the insert having a generally spherical inner contour. The base includes a slot that extends through the thickness dimension of the base. Contained within the slot is a non-deformable insert that abuts the closed end and that has an upwardly directed face with a spherical, concave contour in the face. A ball stud member including a shank with a generally spherical ball at one end thereof and a threaded portion at an opposite end snaps into the spherical inner contour of the polymeric insert and the non-deformable insert. Completing the assembly is a retainer ring that slips over the shank of the ball stud member and into the open end of the housing. The retainer ring also has a spherical contour formed about an inner diameter thereof for cooperating with an upper surface portion of the spherical ball. The housing has a circular flange surrounding the open top where the flange is adapted to be formed atop the retainer ring to lock the retainer ring, the polymeric insert and the ball stud member within the housing.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
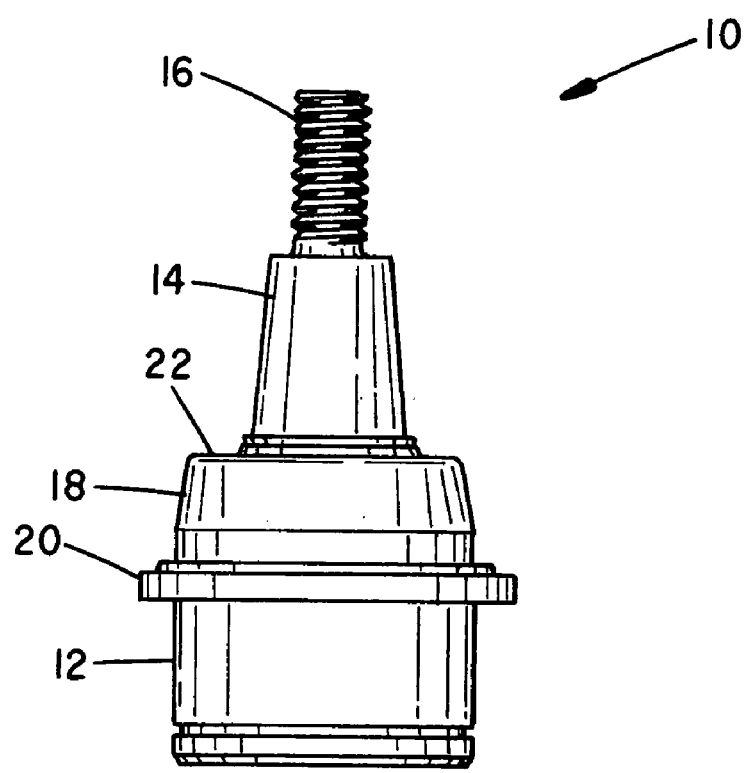
FIG. 1 is a perspective view of an assembled ball joint comprising a preferred embodiment of the present invention.

Certain terminology will be used in the follow description for convenience in reference only and will not be limiting. The words "upwardly", "downwardly", "rightwardly" and "leftwardly" will refer to directions in the drawings to which reference is made. The words "inwardly" and "outwardly" will refer to directions towards and away from, respectively, the geometric center of the device and associated parts thereof. Said terminology will include the words above specifically mentioned, derivatives thereof, and words of similar import.

Referring first to FIG. 1, there is shown a perspective view of an assembled ball joint constructed in accordance with the present invention. It is indicated generally by numeral 10 and includes a housing 12 containing a ball stud 14 only the shank portion 16 of which is seen in FIG. 1 projecting upward through an optional elastomeric dust boot 18 that is secured at its lower end to the housing 12 by means of a ring clip 20 and to the shank 16 by a second ring clip 22.

Figure 2:
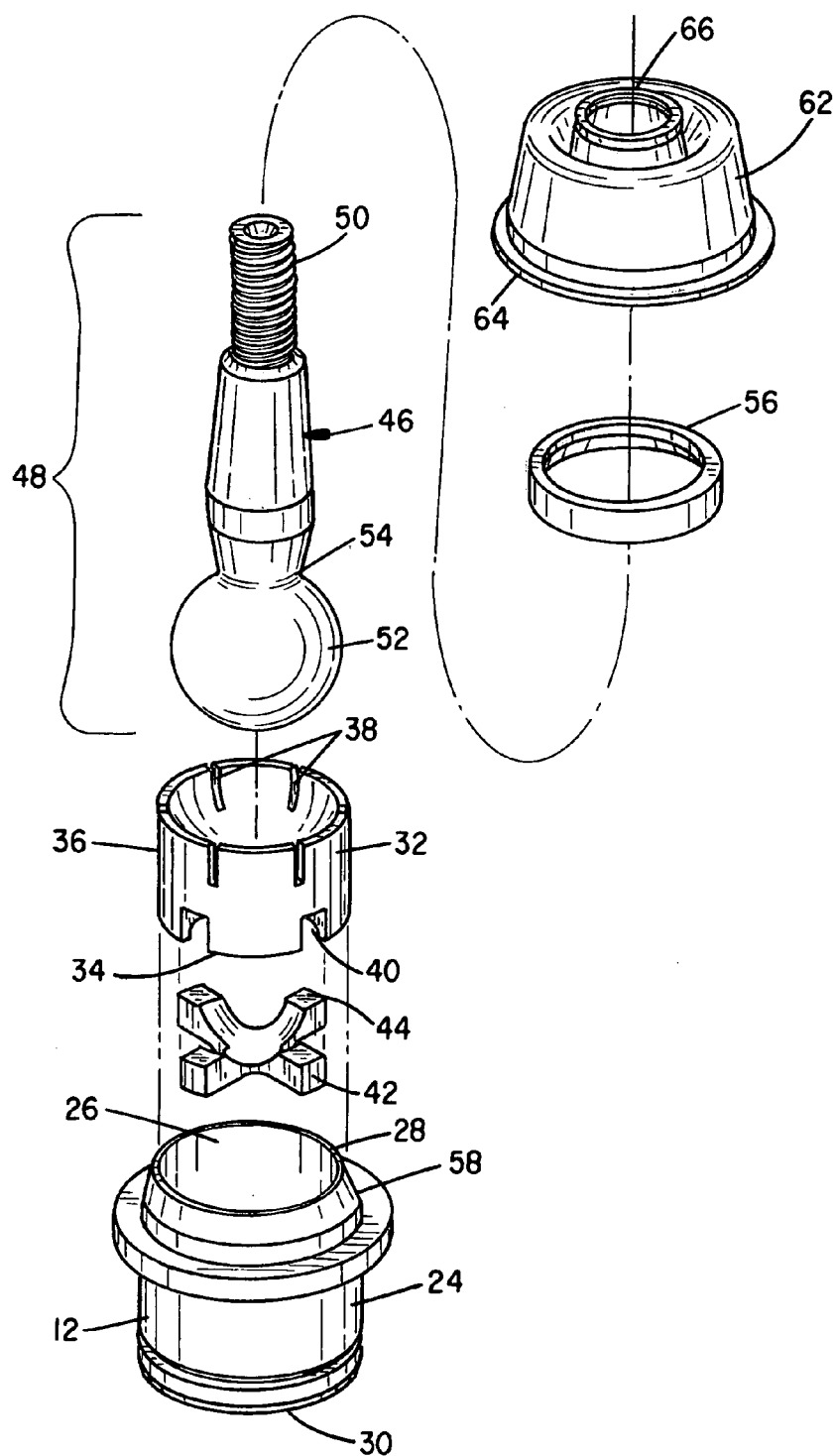
FIG. 2 is an exploded view of the ball joint of FIG. 1.

Referring next to the exploded view of FIG. 2, it can be seen that the housing 12 has a cylindrical outer wall 24 defining a cylindrical cavity 26 having an open receiving end 28 and a closed retaining end or base 30. The housing 12 is preferably made from steel, but other materials may be used as well.

Adapted to fit into the cylindrical cavity 26 of the housing 12 is a polymeric insert 32 having a base 34 with a cylindrical outer wall 36 extending upward from the base 34. As is best seen in the cross-sectional view of FIG. 3, the insert 32 has a generally spherical inner contour and a plurality of short slits extending downward from the upper rim or edge of the insert. Also, a cruciform slot 40 is formed through the thickness of the base of the insert 32 as may best be seen in FIG. 4 which is a bottom view of the insert 32.

Without limitation, the polymeric insert 32 is preferably molded from an Acetal resin with DERLIN® being one such material. DERLIN® plastic is particularly lubricious and exhibits low distortion under compressive loads. It is to be understood that any suitable polymer material can be used for this piece.

Fitted into the cruciform slot 40 in the base of the polymeric insert 32 is a non-deformable insert 42. As seen in FIG. 2, the non-deformable insert 42 has an upwardly directed face 44 with a spherical concave contour recessed into that face. The elastomeric insert 32 carrying the insert 42 is inserted into the cylindrical cavity 26 of the housing member 12 with a zero clearance fit. When so inserted, the base or under surface of the insert 44 abuts the bottom 30 of the housing 12.

With continued reference to FIG. 2, the ball stud member 46 is constructed from a suitable metal such as hardened steel and includes a shank portion 48 that is threaded at a first end 50 allowing attachment of the ball stud to a receiving member by means of a nut (not shown). Integrally formed at the lower end of the ball stud 46 is a spherical ball of a predetermined diameter allowing it to be press fit into the spherical cavity of the polymeric insert 32. The slits 38 permit the upper rim of the insert 32 to spread slightly during insertion of the ball as the ball's diameter dimension is forced into the polymeric insert.

The shank portion 48 of the ball stud has a reduced diameter forming a neck 54 where it meets the ball member 52.

Figure 3:
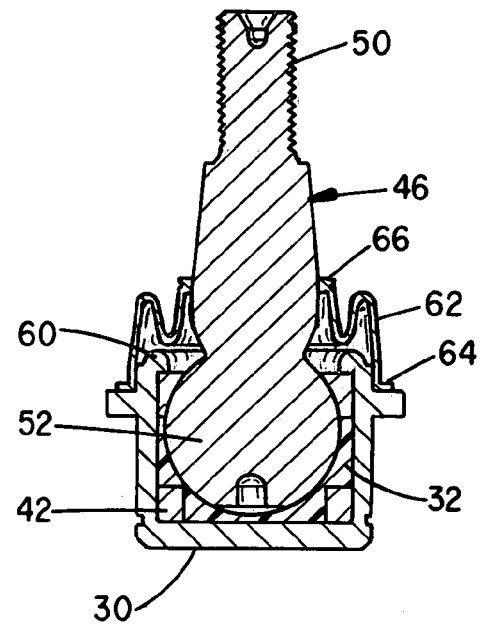
FIG. 3 is a longitudinal cross-sectional view of the ball joint of FIG. 1.
Figure 4:
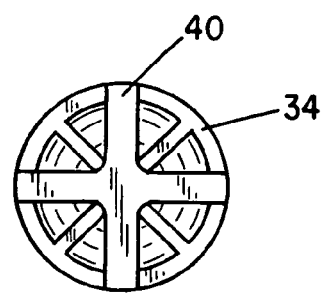
FIG. 4 is a bottom view of the polymeric insert 32 of FIG. 2.

A retainer ring 56 is adapted to slip over the shank portion 48 of the ball stud and, as seen in FIG. 3, the inner surface of the retainer ring 56 also has a spherical contour corresponding to the contour of the ball 52. The retainer ring 56 is insertable through the receiving end 28 of the housing member 24 with a zero clearance fit such that the spherical contoured portion of the retainer ring engages the spherical surface of the ball member 52. Once the retainer ring 56 is in place, a lip 58 surrounding the receiving end 28 of the housing 12 is formed, as at 60 in FIG. 3, to hold the retainer ring in place and preventing tensile force applied between the housing 12 and the ball stud 46 from pulling the ball stud free of the housing. The dimension of the neck 54 on the ball stud will permit the shank portion 48 to be pivoted through a predetermined angle to effectively sweep out a cone.

Completing the assembly is an optional elastomeric boot member 62 having a lower peripheral lip 64 and an upper peripheral lip 66. The lower lip 64 surround the upper portion of the housing 12 and is held in place by a spring clip 64 (FIG. 3). Likewise, the upper lip 66 of the boot 62 is clamped to the shank 48 of the ball stud 46 by a spring clip 66. The function of the boot is to preclude dirt, snow, water, etc. from entering the assembly.

The non-deformable metallic insert and the retainer ring are preferably a powdered metal alloy and are oil impregnated to provide a non-abrasive, lubricated surface in contact with the ball in the ball stud.

The ball joint of the present invention uses both a molded plastic cup 32 and an integrated non-deformable support piece 42 to allow both a smooth preloaded initial condition and instant rigid support during high inward loading conditions. Loads applied inward are first absorbed by the plastic cup and then transferred to the non-deformable support piece and to the base 30 of the housing because when the insert 42 is inserted into the cruciform slot in the polymeric insert 32, the spherical contoured surface in the face of the insert 42 is recessed slightly with respect to the spherical contour of the polymeric insert 32. The vertical clearance between these two pieces is such that the transfer of the load is virtually instantaneous and the elastomeric insert is not extruded or otherwise distorted. Moreover, the internal plastic cup 32 with the integral non-deformable support 42 eliminates the typical clearance condition found in prior art ball joint designs incorporating a spring component.

Because the ball 52 is one continuous surface, there is full surface contact and maximum support from the polymeric insert 32 and the non-deformable insert 42. Traditional prior art designs have used a ball stud with two distinctly different spherical surfaces. The surface that supports inward loading is distinctly smaller and thus less capable of supporting loads and acting as a wear surface in these prior art arrangements.

From the above description of the invention, those skilled in the art will perceive improvements, changes and modifications in the invention. Such improvements, changes and modifications within the skill of the art are intended to be covered by the appended claims.

We claim:

1. A ball joint comprising
   (a) a housing defining a cylindrical recess having a receiving end and a closed retaining end;
   (b) a polymeric insert having a base with a cylindrical outer wall extending upward from the base, the insert having a generally spherical inner contour, the base including radial slots extending through a thickness dimension of the base, and the cylindrical outer wall being dimensioned to be insertable into the cylindrical recess of the housing through said receiving end with generally a zero clearance fit;
   (c) a non-deformable, cruciform insert disposed in the radial slots and supported by said closed retaining end, the non-deformable insert having an upwardly directed face with a spherical contour recessed into said face, the face of the non-deformable insert being depressed relative to the inner contour of the polymeric insert;
   (d) a ball stud member including a shank with a generally spherical metal ball at one end thereof and a shaft portion at an opposite end, said ball contained within and conforming to the spherical inner contour of the polymeric insert and of the non-deformable insert; and
   (e) a retainer ring fitted over the ball stud member and into the receiving end of the housing, the retainer ring having a spherical contour formed about an inner diameter of the retainer ring for cooperating with an upper surface portion of the spherical ball.

2. The ball joint as in claim 1 wherein the housing includes a circular flange surrounding the receiving end, the flange being formed atop the retainer ring to lock the retainer ring within the housing.

3. The ball joint as in claim 1 wherein the spherical contour in the face of non-deformable insert is recessed with respect to the spherical inner contour of the polymeric insert such that inwardly-directed compressive loads on the ball stud member are initially absorbed by the polymeric insert and subsequently by the non-deformable insert as the polymeric insert becomes compressed.

4. The ball joint as in claim 1 and further including a flexible, elastomeric dust boot of generally cylindrical shape with upper and lower open ends, the upper open end being clamped to the shank of the ball stud and the lower open end being clamped to the housing.

5. The ball joint as in claim 1 wherein the polymeric insert is a wear resistant formable material.

6. The ball joint as in claim 5 wherein the formable material comprises acetal.

7. The ball joint as in claim 1 wherein the non-deformable insert is an oil impregnated sintered alloy steel.

* * * * *